United States Patent
Berke et al.

(10) Patent No.: US 9,916,165 B2
(45) Date of Patent: *Mar. 13, 2018

(54) SYSTEMS AND METHODS TO OPTIMIZE BOOT FOR INFORMATION HANDLING SYSTEM COMPRISING PERSISTENT MEMORY

(71) Applicant: Dell Products L.P., Round Rock, TX (US)

(72) Inventors: Stuart Allen Berke, Austin, TX (US); Shane Michael Chiasson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 70 days.

This patent is subject to a terminal disclaimer.

(21) Appl. No.: 14/831,529

(22) Filed: Aug. 20, 2015

(65) Prior Publication Data
US 2017/0052794 A1 Feb. 23, 2017

(51) Int. Cl.
*G06F 9/44* (2006.01)

(52) U.S. Cl.
CPC .................. *G06F 9/4406* (2013.01)

(58) Field of Classification Search
CPC ........ G06F 9/4401; G06F 15/177; G06F 1/26; G06F 1/28; G06F 9/4406; G06F 9/4403; G06F 9/4405
See application file for complete search history.

(56) References Cited

U.S. PATENT DOCUMENTS

| | | | | |
|---|---|---|---|---|
| 2010/0005285 A1* | 1/2010 | Yun | ........................ | G06F 1/1616 713/2 |
| 2012/0185684 A1* | 7/2012 | Lee | ........................ | G06F 1/263 713/2 |
| 2014/0380030 A1* | 12/2014 | Jain | ........................ | G06F 9/4401 713/2 |
| 2016/0231804 A1* | 8/2016 | Bulusu | .................. | G06F 1/3287 |
| 2016/0259649 A1* | 9/2016 | Poornachandran | .... | G06F 1/3203 |
| 2017/0038807 A1* | 2/2017 | Bittlestone | ................ | G06F 1/26 |
| 2017/0052716 A1* | 2/2017 | Jenne | .................... | G06F 3/0604 |
| 2017/0052791 A1* | 2/2017 | Jenne | .................... | G06F 9/4403 |
| 2017/0052794 A1* | 2/2017 | Berke | .................... | G06F 9/4406 |

* cited by examiner

*Primary Examiner* — Fahmida Rahman
(74) *Attorney, Agent, or Firm* — Jackson Walker L.L.P.

(57) ABSTRACT

A basic input/output system may be configured to, during boot of an information handling system in a pre-operating system environment of the information handling system, calculate an amount of energy required to perform a persistent memory save operation in a persistent memory of the information handling system in order to transfer data from a volatile memory of the persistent memory communicatively coupled to the processor to a non-volatile memory of the persistent memory communicatively coupled to the volatile memory, cause charging of an energy storage device for providing electrical energy to perform persistent memory save operations at least until a charging level of the energy storage device satisfies the amount of energy, and boot to an operating system of the information handling system responsive to the charging level of the energy storage device satisfying the amount of energy.

14 Claims, 3 Drawing Sheets

SYSTEMS AND METHODS TO OPTIMIZE BOOT FOR INFORMATION HANDLING SYSTEM COMPRISING PERSISTENT MEMORY

TECHNICAL FIELD

The present disclosure relates in general to information handling systems, and more particularly to systems and methods for optimizing boot of an information handling system comprising persistent memory.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly using persistent memory technologies such as Non-Volatile Dual In-line Memory Modules (NVDIMMs). An NVDIMM is a memory module that may retain data even when electrical power is removed either from an unexpected power loss, system crash or from a normal system shutdown. To enable such functionality, an NVDIMM may include a traditional dynamic random access memory (DRAM) which may store data during normal operation when electrical power is available from a power supply unit and a flash memory to back up data present in the DRAM when a loss of electrical power from the power supply unit occurs. A battery, capacitor, or other energy storage device either internal or external to the NVDIMM may supply electrical energy for a "save" operation to transfer data from the DRAM to the flash memory in response to a power loss event from the power supply unit.

To ensure availability of non-volatile memory, many information handling systems are configured to not fully boot until the energy storage device is fully charged or charged to a static minimum charge level. Waiting for the energy storage device to reach such charging level may add minutes or even tens of minutes to boot time and/or time-to-ready for applications requiring persistent memory.

SUMMARY

In accordance with the teachings of the present disclosure, the disadvantages and problems associated with existing approaches to booting an information handling system comprising a persistent memory may be reduced or eliminated.

In accordance with embodiments of the present disclosure, an information handling system may include a processor, and a basic input/output system communicatively coupled to the processor. The basic input/output system may be configured to, during boot of the information handling system in a pre-operating system environment of the information handling system, calculate an amount of energy required to perform a persistent memory save operation in a persistent memory of the information handling system in order to transfer data from a volatile memory of the persistent memory communicatively coupled to the processor to a non-volatile memory of the persistent memory communicatively coupled to the volatile memory, cause charging of an energy storage device for providing electrical energy to perform persistent memory save operations at least until a charging level of the energy storage device satisfies the amount of energy, and boot to an operating system of the information handling system responsive to the charging level of the energy storage device satisfying the amount of energy.

In accordance with these and other embodiments of the present disclosure, a method may include, during boot of an information handling system executing in a pre-operating system environment of the information handling system, calculating an amount of energy required to perform a persistent memory save operation in a persistent memory of the information handling system in order to transfer data from a volatile memory of the persistent memory communicatively coupled to the processor to a non-volatile memory of the persistent memory communicatively coupled to the volatile memory, causing charging of an energy storage device for providing electrical energy to perform persistent memory save operations at least until a charging level of the energy storage device satisfies the amount of energy, and booting to an operating system of the information handling system responsive to the charging level of the energy storage device satisfying the amount of energy.

In accordance with these and other embodiments of the present disclosure, an article of manufacture may include a non-transitory computer-readable medium and computer-executable instructions carried on the computer-readable medium, the instructions readable by a processor. The instructions, when read and executed, may cause the processor to, during boot of an information handling system, calculate an amount of energy required to perform a persistent memory save operation in a persistent memory of the information handling system in order to transfer data from a volatile memory of the persistent memory communicatively coupled to the processor to a non-volatile memory of the persistent memory communicatively coupled to the volatile memory, cause charging of an energy storage device for providing electrical energy to perform persistent memory save operations at least until a charging level of the energy storage device satisfies the amount of energy, and boot to an operating system of the information handling system responsive to the charging level of the energy storage device satisfying the amount of energy.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
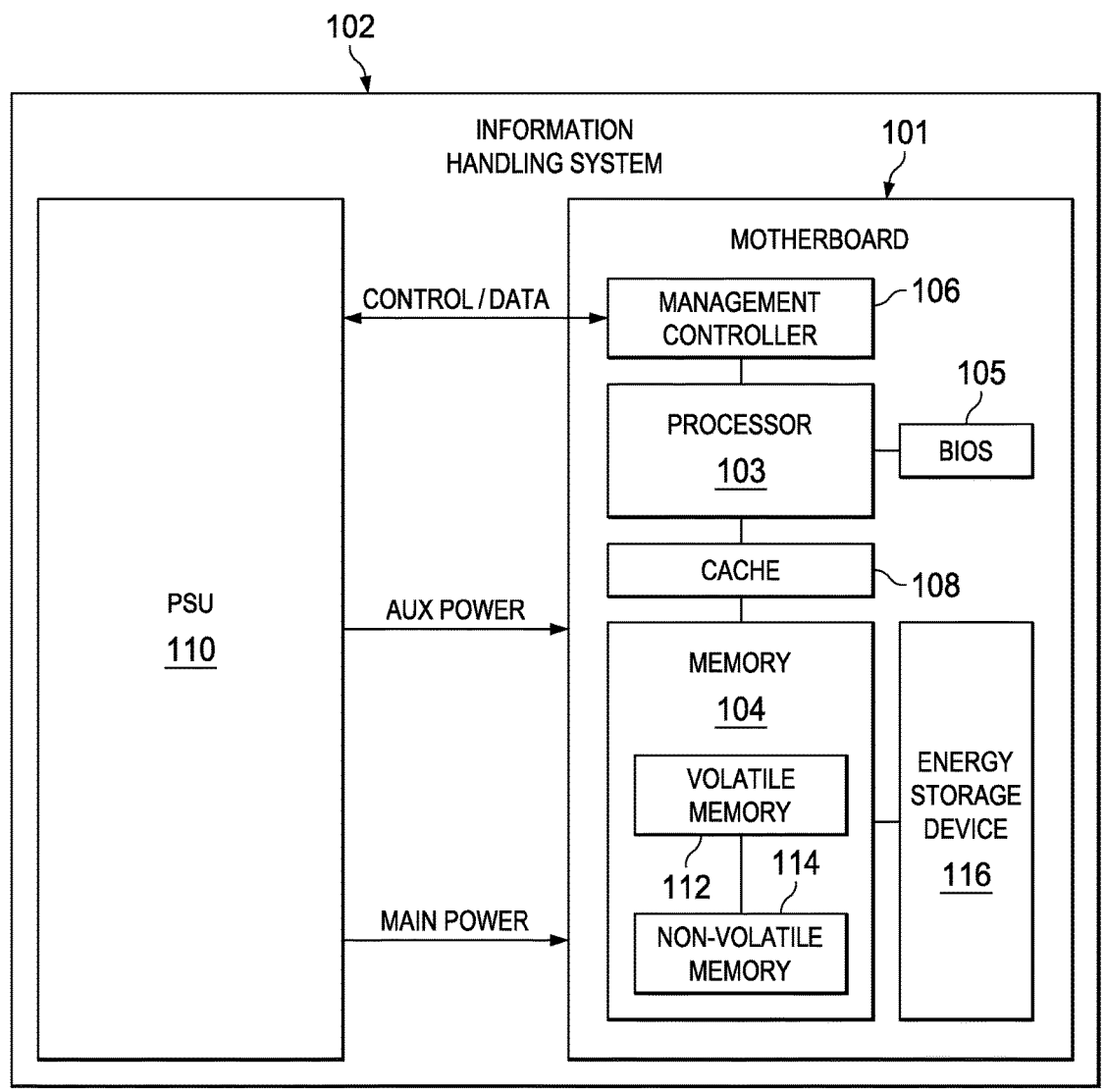
FIG. 1 illustrates a block diagram of an example information handling system, in accordance with embodiments of the present disclosure.
Figure 2:
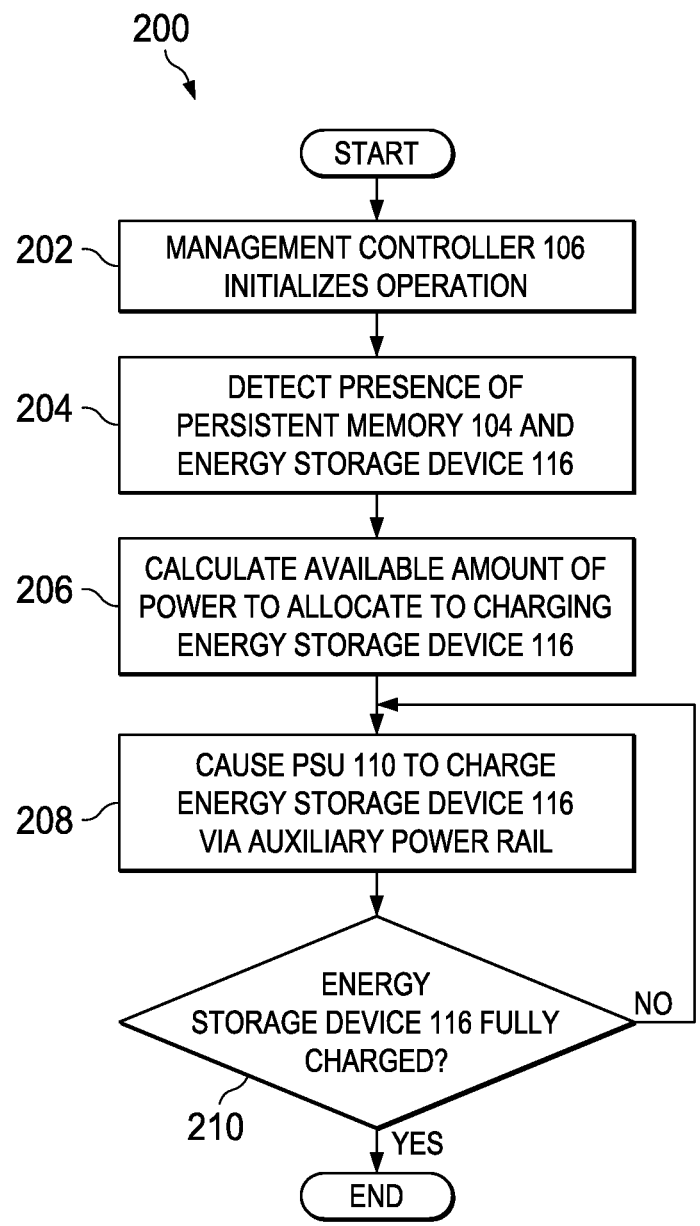
FIG. 2 illustrates a flow chart of an example method for optimizing boot time by charging, via system auxiliary power, an energy storage device for providing electrical energy for a persistent memory save operation, in accordance with embodiments of the present disclosure.
Figure 3:
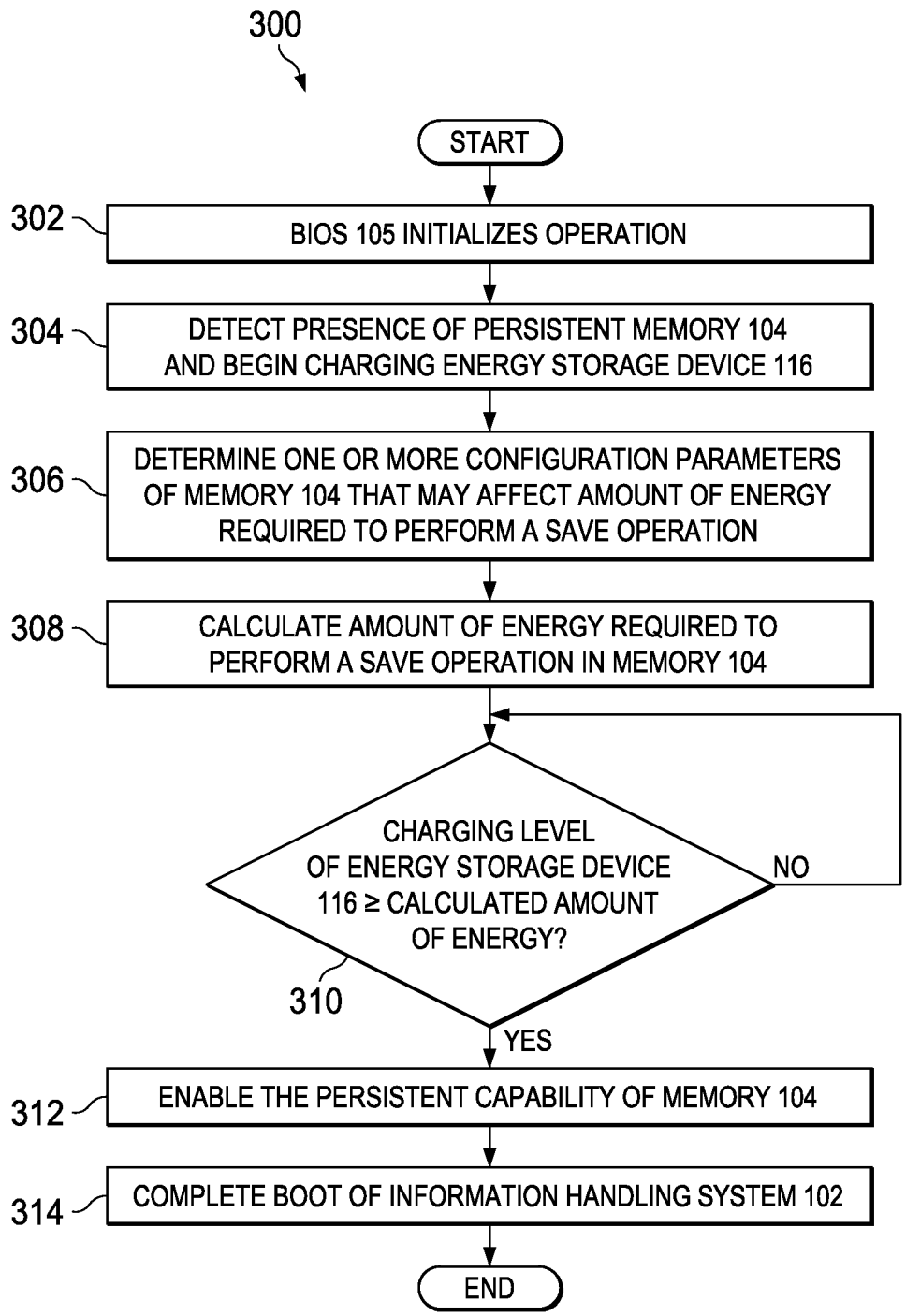
FIG. 3 illustrates a flow chart of an example method for optimizing boot time by dynamically determining energy requirements of a persistent memory to execute a persistent memory save operation, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102. As depicted, information handling system 102 may include a power supply unit (PSU) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a BIOS 105, a management controller 106, a processor cache 108, and an energy storage device 116, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may comprise a persistent memory (e.g., comprising one or more NVDIMMs) that includes a volatile memory 112 (e.g., DRAM or other volatile random-access memory) and non-volatile memory 114 (e.g., flash memory or other non-volatile memory). During normal operation, when PSU 110 provides adequate power to components of information handling system 102, data written to memory 104 from processor 103 and/or cache 108 may be stored in volatile memory 112. However, in the event of loss of system input power or a power fault of PSU 110 that prevents delivery of electrical energy from PSU 110 to memory 104, data stored in volatile memory 112 may be transferred to non-volatile memory 114 in a save operation. After input power is restored, or a faulty PSU 110 is replaced, such that PSU 110 is again operable to provide electrical energy to information handling resources of information handling system 102, on the subsequent power-on of information handling system 102, data may be copied from the non-volatile memory 114 back to volatile memory 112 via a restore operation. The combined actions of data save and then data restore, allows the data to remain persistent through a power disruption.

Although not explicitly shown in FIG. 1, memory 104 may also include hardware, firmware, and/or software for carrying out save operations.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. In some embodiments, BIOS 105 may also be configured to optimize boot of information handling system 102 by dynamically determining energy requirements of memory 104 for performing a save operation, as described in greater detail below.

Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSU 110 may communicate information regarding status and/or health of PSU 110 and/or measurements of electrical parameters (e.g., electrical currents or voltages) present within PSU 110. In some embodiments, management controller 106 may also be configured to manage charging of energy storage device 116 when processor 103 and other components of information handling system 102 are powered down, as described in greater detail below.

Cache 108 may comprise a memory used by processor 103 to reduce the average time to access data from main memory 104. Cache 108 may be a smaller, faster memory than memory 104 and may store copies of frequently-used data and instructions from memory 104. In some embodiments, cache 108 may comprise an independent data cache and instruction cache. In these and other embodiments, a cache may be organized in a hierarchy of multiple cache levels (e.g., level 1, level 2, etc.). All or part of cache 108 may be configured as a write-back cache, in which processor 103 writes may be stored in cache 108 without also writing the data to memory 104, until a subsequent action such as cache line invalidate or flush operation forces the data to be written back to memory 104. Thus in write-back cache, the most up-to-date copy of the data may only reside in the cache indefinitely. Some part of cache 108 may also be configured as a write-through cache, in which processor 103 writes are stored in cache but also immediately to memory 104 such that the memory 104 has the most up-to-date copy of the data.

Generally speaking, PSU 110 may include any system, device, or apparatus configured to supply electrical current to one or more information handling resources of information handling system 102. As shown in FIG. 1, PSU 110 may provide (a) a main power rail, indicated in FIG. 1 as "MAIN POWER," and (b) an auxiliary power rail, indicated in FIG. 1 as "AUX POWER." The main power rail may generally be used to provide power to information handling resources of information handling system 102 when information handling system 102 is turned on. On the other hand, the auxiliary power rail may generally be used to provide power to certain auxiliary information handling resources when energy is not supplied via the main power rail. For example, the auxiliary power rail may be used to provide power to management controller 106 when electrical energy is not provided to processor 103, memory 104, and/or other information handling resources via the main power rail.

Energy storage device 116 may comprise any system, device, or apparatus configured to store energy which may be used by memory 104 to perform save operations in response to a loss of an alternating current input source of other power fault of PSU 110. In some embodiments, energy storage device 116 may comprise a battery configured to convert stored chemical energy into electrical energy. In other embodiments, energy storage device 116 may comprise a capacitor or "supercap" configured to store electrical energy and deliver such electrical energy to memory 104 when needed to perform save operations (e.g., by closure of a switch to electrically couple such capacitor to components of memory 104). Although energy storage device 116 is shown in FIG. 1 as external to memory 104, in some embodiments energy storage device 116 may be integral to memory 104. In these and other embodiments, energy storage device 116 may be charged from PSU 110. In some embodiments, energy storage device 116 may be communicatively coupled to management controller 106 via a systems management interface such as, for example, Inter-Integrated Circuit (i2C), System Management Bus (SMBus) or Power Management Bus (PMBus), allowing management controller 106 to receive health and status (e.g., state of charge) from and/or communicate commands to energy storage device 116. In some embodiments, energy storage device 116 may provide energy to a plurality of persistent memory 104 devices.

In addition to motherboard 101, processor 103, memory 104, BIOS 105, management controller 106, cache 108, energy storage device 116, and PSU 110, information handling system 102 may include one or more other information handling resources. For example, in some embodiments, information handling system 102 may include more than one PSU 110 and/or more than one energy storage device 116.

FIG. 2 illustrates a flow chart of an example method 200 for optimizing boot time of information handling system 102 by charging energy storage device 116 via the auxiliary power rail, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

In some embodiments, method 200 may execute (e.g., by management controller 106) when information handling system 102 is being powered off such that the main power rail does not deliver electrical energy to processor 103 and other information handling resources of information handling system 102. Accordingly, in such embodiments, if information handling system 102 is powered on such that electrical energy is supplied to processor 103 from the main power rail during execution of method 200, method 200 may then terminate. In such embodiments, responsive to termination of method 200 due to powering on of information handling system 102, method 300 described below may initialize and execute.

At step 202, in response to auxiliary power being applied, management controller 106 may initialize its operation. At step 204, after initialization, management controller 106 may detect the presence of persistent memory 104 and energy storage device 116. In some embodiments, persistent memory presence and type detection may be accomplished by reading a Joint Electron Device Engineering Council (JEDEC) industry-standard Serial Presence Detect (SPD) EEPROM integral to persistent memory 104. In other embodiments, energy storage device 116 presence may be determined by directly reading energy storage device 116 status registers, or indirectly by reading persistent memory 104 status registers, via SMBus or other suitable methods. At step 206, management controller 106 may calculate or otherwise determine an available amount of power to allocate to charging energy storage device 116. For example, management controller 106 may determine the available amount of power to allocate to charging energy storage device 116 based on a difference between the power capacity of the auxiliary power rail and a power needed by management controller 106 to perform its management tasks and/or other functionality, including without limitation power needed to power information handling resources other than management controller 106 which may be used or accessed by management controller 106 (e.g., network interfaces, memories, etc.).

At step 208, management controller 106 may, in accordance with its power management capabilities, cause PSU 110 to charge energy storage device 116 via the auxiliary power rail. For example, management controller 106 may instruct or otherwise cause energy storage device 116 to charge from the auxiliary power rail via an instruction issued over I2C bus, SMBus, or general purpose input/output (GPIO) bus.

At step 210, management controller 106 may determine if energy storage device 116 is fully charged (e.g., by reading status information from energy storage device via I2C, SMBus, PMBus, etc.). If energy storage device 116 is not fully charged, method 200 may proceed again to step 208. Otherwise, if energy storage device 116 is fully charged, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

FIG. 3 illustrates a flow chart of an example method 300 for optimizing boot time of information handling system 102 by dynamically determining energy requirements of memory 104 for executing a persistent memory save operation, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

As described below, method 300 may execute in a pre-operating system execution environment of BIOS 105.

At step 302, in response to information handling system 102 being powered on (e.g., processor 103 being provided electrical energy via the main power rail), BIOS 105 may initialize and begin execution. At step 304, BIOS 105 may detect the presence of persistent memory 104 and begin charging energy storage device 116. At step 306, BIOS 105 may determine one or more configuration parameters of memory 104 that may affect the amount of energy required to perform a save operation. Such configuration parameters may include, without limitation, a size of memory 104, type(s) of memory modules (e.g., NVDIMMs) integral to memory 104, number of memory modules (e.g., NVDIMMs integral to memory 104), error correction code mode, encryption mode, and/or other parameters.

At step 308, based on the configuration parameters, BIOS 105 may calculate an amount of energy required to perform a save operation in memory 104 to transfer data from volatile memory 112 to non-volatile memory 114. In these and other embodiments, measurements may be taken to characterize the amount of energy required to perform a save operation. For example, BIOS 105 may cause memory 104 to emulate or perform a test save operation for all or a portion of memory 104, measure the time to complete such save operation, measure the power delivered to memory 104 during such save operation, and calculate the amount of energy based on such measurements (e.g., in a manner identical or similar to that disclosed in U.S. patent application Ser. No. 14/829,314 filed Aug. 18, 2015). In other embodiments, the energy required for each specific persistent memory type found, may be determined by pre-determined characterization data table look-up within BIOS 105. In some embodiments, additional charge margin may be added to cover variations in operating temperature, cover aging of the energy storage device, cover measurement inaccuracies, and/or other similar guard bands or tolerances.

At step 310, BIOS 105 may determine if the charging level of energy storage device 116 has satisfied (e.g., met or exceeded) the calculated amount of energy required to perform a save operation. If the charging level of energy storage device 116 has satisfied the calculated amount of energy, method 300 may proceed to step 312. Otherwise, method 300 may remain at step 310 until the charging level of energy storage device 116 has satisfied the calculated amount of energy.

At step 312, responsive to the charging level of energy storage device 116 satisfying the calculated amount of energy, BIOS 105 may enable the persistent capability of memory 104. At step 314, BIOS 105 may complete its pre-OS boot functions and boot to an operating system of the information handling system.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order. For example, in some embodiments, step 314 may precede steps 312, 310, 308, 306, or 304. In such embodiments, a handshake process may be used between BIOS 105 and an operating system executing on processor 103 to provide an indication that energy storage device 116 is sufficiently charged. In other embodiments, a similar method may be used to ensure the energy storage device 116 has sufficient charge to support two or more consecutive power loss situations.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor;
   a basic input/output system communicatively coupled to the processor and configured to, during boot of the information handling system in a pre-operating system environment of the information handling system:
   calculate an amount of energy required to perform a persistent memory save operation in a persistent memory of the information handling system in order to transfer data from a volatile memory of the persistent memory communicatively coupled to the processor to a non-volatile memory of the persistent memory communicatively coupled to the volatile memory, wherein calculating the amount of energy comprises:
   measuring a time for completing a test save operation on at least a portion of the persistent memory;
   measuring a power delivered to the persistent memory during performance of the test save operation; and
   calculating the amount of energy based on the time and the power; and
   cause charging of an energy storage device for providing electrical energy to perform persistent memory save operations at least until a charging level of the energy storage device satisfies the amount of energy; and
   boot to an operating system of the information handling system responsive to the charging level of the energy storage device satisfying the amount of energy.

2. The information handling system of claim 1, wherein calculating the amount of energy comprises:
   determining one or more parameters of the persistent memory affecting energy usage of the persistent memory in performing save operations; and
   calculating the energy based on the one or more parameters.

3. The information handling system of claim 2, wherein the one or more parameters include at least one of a size of the persistent memory, a type of memory module integral to the persistent memory, a number of memory modules integral to the persistent memory, an error correction code mode, and an encryption mode.

4. The information handling system of claim 1, further comprising a management controller communicatively coupled to the processor and configured to, when the information handling system is powered off such that electrical energy is withdrawn from the processor, charge the energy storage device.

5. The information handling system of claim 1, wherein the test save operation comprises one of an actual save operation and an emulated save operation.

6. A method comprising, during boot of an information handling system executing in a pre-operating system environment of the information handling system:
   calculating an amount of energy required to perform a persistent memory save operation in a persistent memory of the information handling system in order to transfer data from a volatile memory of the persistent memory communicatively coupled to a processor to a non-volatile memory of the persistent memory communicatively coupled to the volatile memory, wherein calculating the amount of energy comprises:
   measuring a time for completing a test save operation on at least a portion of the persistent memory;
   measuring a power delivered to the persistent memory during performance of the test save operation; and
   calculating the amount of energy based on the time and the power; and
   causing charging of an energy storage device for providing electrical energy to perform persistent memory save operations at least until a charging level of the energy storage device satisfies the amount of energy; and
   booting to an operating system of the information handling system responsive to the charging level of the energy storage device satisfying the amount of energy.

7. The method of claim 6, wherein the test save operation comprises one of an actual save operation and an emulated save operation.

8. The method of claim 6, wherein calculating the amount of energy comprises:
   determining one or more parameters of the persistent memory affecting energy usage of the persistent memory in performing save operations; and
   calculating the energy based on the one or more parameters.

9. The method of claim 8, wherein the one or more parameters include at least one of a size of the persistent memory, a type of memory module integral to the persistent memory, a number of memory modules integral to the persistent memory, an error correction code mode, and an encryption mode.

10. The method of claim 6, further comprising, when the information handling system is powered off such that electrical energy is withdrawn from a processor of the information handling system, charging the energy storage device.

11. An article of manufacture comprising:
   a non-transitory computer-readable medium; and
   computer-executable instructions carried on the computer-readable medium, the instructions readable by a processor, the instructions, when read and executed, for causing the processor to, during boot of an information handling system:
      calculate an amount of energy required to perform a persistent memory save operation in a persistent memory of the information handling system in order to transfer data from a volatile memory of the persistent memory communicatively coupled to the processor to a non-volatile memory of the persistent memory communicatively coupled to the volatile memory, wherein calculating the amount of energy comprises:
         measuring a time for completing a test save operation on at least a portion of the persistent memory;
         measuring a power delivered to the persistent memory during performance of the test save operation; and
         calculating the amount of energy based on the time and the power; and
      cause charging of an energy storage device for providing electrical energy to perform persistent memory save operations at least until a charging level of the energy storage device satisfies the amount of energy; and
      boot to an operating system of the information handling system responsive to the charging level of the energy storage device satisfying the amount of energy.

12. The article of claim 11, wherein calculating the amount of energy comprises:
   determining one or more parameters of the persistent memory affecting energy usage of the persistent memory in performing save operations; and
   calculating the energy based on the one or more parameters.

13. The article of claim 12, wherein the one or more parameters include at least one of a size of the persistent memory, a type of memory module integral to the persistent memory, a number of memory modules integral to the persistent memory, an error correction code mode, and an encryption mode.

14. The article of claim 11, wherein the test save operation comprises one of an actual save operation and an emulated save operation.

\* \* \* \* \*